Patented Feb. 22, 1927.

1,618,795

UNITED STATES PATENT OFFICE.

FRANK E. BACHMAN, OF PORT HENRY, NEW YORK; BESSIE T. BACHMAN EXECUTRIX OF SAID FRANK E. BACHMAN, DECEASED.

PROCESS FOR THE RECOVERY OF TITANIC ACID, IRON, AND MAGNESIA FROM TITANIFEROUS ORES.

No Drawing.    Application filed March 18, 1921.  Serial No. 453,355.

My invention relates to improvements on processes for the recovery of titanic acid, iron and magnesia from titaniferous ores, containing appreciable quantities of them. Also to the recovery of chemicals used in the processes as more advanced products of manufacture or those used in the processes by proceedings whereby I am enabled to obtain purer products and more complete recoveries than have been heretofore obtained.

In outline my process consists in converting the iron oxides of the ore into iron and recovering it; the titanium oxide and certain of the impurities are formed into a readily fusible slag with an alkali such as sodium carbonate, from the slag I recover the soda, if sodium is used, as caustic soda, by an improved procedure, resulting in a larger recovery of soda than is obtained by processes before used. I further purify the reaction product by an improved process whereby I obtain a titanium concentrate which is more readily soluble in acid and is freer from impurities than are titanium concentrates heretofore produced. The titanium concentrate I dissolve in sulphuric acid. From the solution I separate my modified meta-titanic acid and purify it as in my copending application Serial No. 285,873, filed March 28th, 1919.

The process is applicable to all titanium-bearing minerals, but more especially to those of the ilmenite series, which may be obtained as a by-product from the concentration of titaniferous iron ore; a typical analysis of which is silica, 1.72; iron oxide (FeO), 39.21; iron oxide ($Fe_2O_3$), 5.21; alumina, .65; titanic oxide, 49.10; manganese oxide (MNO), .55; vanadic oxide ($V_2O_3$), trace; chromium oxide ($Cr_2O_3$), trace; lime, trace; magnesia, 2.16; alkalies, trace; phosphoric anhydride, .009; sulphur, .158; carbon, carbonic anhydride and water, 1.71.

In carrying out my process I pulverize the ilmenite and mix it with carbon or carbonaceous matter and preferably soda ash, sodium carbonate, in the proportions necessary to, when heated, remove the oxygen of the iron oxide by direct combination of carbon and oxygen and soda ash in sufficient quantity to form sodium compounds with the titanic oxide, silica, alumina, etc., contained in the carbonaceous matter and the ilmenite. In the following description I will refer to sodium compounds by way of example it being understood that other alkalis may be used. When using ilmenite of the composition given above, I have found 100 parts ilmenite, 11 parts powdered charcoal and 73 parts soda ash a suitable mixture. This mixture I nodulize or clinker by heating it to a suitable temperature and stirring or balling. I prefer to do this in a rotary kiln similar to those used in the manufacture of Portland cement. During the nodulizing the mixture is materially reduced in volume and its constituents brought into more intimate contact; sodium compounds such as sodium titanate, sodium aluminate and sodium silicate are formed with evolution of carbon dioxide and the iron oxide gives up a portion of its oxygen to the carbon of the mixture with evolution of carbon monoxide. The condensing of the mixture tends to hasten the reaction between the iron and carbon and to prevent loss of material in subsequent operations. It further renders it suitable for further treatment in continuous retorts or in shaft or blast furnaces. To complete the reduction of the iron oxides, I then further heat the nodules or clinker in crucibles, retorts or in shaft or blast furnaces, at a temperature sufficient to reduce the iron oxide to iron but not melt the sodium compounds until the iron content is reduced to a point that when melted, all or practically all of the iron will separate as metallic iron. The mixture is then melted and brought to a sufficient temperature to bring it to that fluid condition at which the iron will separate from the sodium slag by gravity and settle to the bottom of the melting furnace. It will be noted that when crucibles or electric furnaces are used, the preliminary heating in retorts may be eliminated if proper heat regulation and exclusion of air can be had. I prefer to use shaft or blast furnaces on account of the greater economy of fuel attainable by their use. When reducing, carbon monoxide is given off, which may be utilized to heat the retort or crucible containing the mixture. When shaft or blast furnaces are used, the nodules or clinkers are charged into them together with sufficient fuel, such as charcoal, coke or anthracite coal, to melt the iron and slag. While descending through the shaft of the furnace, the iron oxides are completely reduced and the formation of sodium compounds is completed. The greater part of any carbon dioxide which may be set free by the formation of sodium, titanium, aluminum and silicon compounds from any uncombined soda ash charged is converted into carbon monoxide as is the carbon of the fuel charged. This results in a gas higher in carbon monoxide than is usually obtained in blast furnace operations and therefore of greater heating value for use in gas engines, raising steam or heating the blast used in the furnace. The iron produced can be tapped from the furnace by any of the means known to those skilled in the art. It will be of great value owing to the low phosphorus content of ilmenite ores. It will contain all of the phosphorus of the ore, the reducing carbon and fuel used and be exceedingly low in silicon content. A sample melted in a crucible contained Si.O4; P.015; carbon, 2.24 percent; Mn, trace. The slag contains the remaining constituents of the charge, other than the carbon and carbon dioxide and such portion of sulphur as may pass into the iron, combined to form sodium compounds and the unreduced iron, which, if the process is properly conducted, should not exceed 2% of the iron charged. In practice, I have never found it to contain more than 1.98% of the iron charged. The iron and slag are withdrawn from the furnace by any of the means known to those skilled in the art. The iron is cast into merchantable shapes for sale or use. The slag is disintegrated while hot, as by blowing it with steam or compressed air as in the manufacture of slag or mineral wool, or preferably by pouring the melted slag into a vessel containing water or a solution of caustic soda in water, as in the manufacture of granulated slag from blast furnaces. This disintegration renders the slag more easily and cheaply pulverized than when cast into larger pieces and slowly cooled. When run into water, or water containing caustic soda, decomposition and solution begin, immediately producing caustic soda and soluble sodium compounds, such as silicate and aluminate of soda passing into solution. To enable me to obtain a more perfect recovery of soda and to reduce the consumption of sulphuric acid necessary to purify the product, I preferably further reduce the size of the particles of the slag, by grinding them in rolls, ball or roller mills, to any fineness desired. The finely ground slag and sufficient water to dissolve all of the soluble contents are then placed in a vessel, capable of resisting pressure, which is arranged to agitate the contents and heated under pressure, as by admitting live steam at any suitable pressure. I have found the pressure and temperature may vary through a wide range and the time required to complete their decomposition and solution to vary with the fineness to which the slag was ground. A lot ground to pass a 100 mesh screen heated at 100 pounds gage pressure for one hour, was so completely decomposed that it contained on analysis 2.10% soda, being less than 3% of the soda charged. The reactions are as follows:

$$Na_2CO_3 + TiO = Na_2TiO_3 + CO_2$$

$$Na_2TiO_3 + XH_2O = TiO_2 XH_2O + 2NaOH$$

and $$CO_2 + C = 2CO.$$

The solution which consists of caustic soda containing as impurities the greater part of the silica and alumina as sodium compounds and about one-third of the sulphur contained in the mixture charged, which may be of a high degree of concentration, is then separated from the solid material. By this means when the process is properly carried out, the recovery of soda should be from 95 to 97% of that charged. It will be suitable for many uses in the arts. Such for example as the manufacture of soap. It may be shipped as a liquid without further concentration or may be evaporated to higher concentration or to a solid state, if desired. Owing to the increase in value of its soda content above the value of soda as soda ash, its production will often pay more than the cost of the process. The solid reaction product remaining will consist largely of hydrated titanic oxide, small amounts of undecomposed titanate, silicate and aluminate of soda and oxides of iron and manganese and magnesia together with a small amount of carbon. It is exceptionally soluble in sulphuric acid and may be dissolved without further purification. I find, however, that it is generally desirable to further purify it as by so doing I obtain a purer sulphuric acid by-product of sufficiently greater value to pay for the purification. To remove the greater part of the impurities I add to the solid matter sufficient sulphuric acid to form sulphates with its contained magnesia, soda, alumina, iron and manganese and any other elements present which form sulphates.

As a source of sulphuric acid, I prefer to use acid recovered from a previous operation as most economical. I dilute the acid sufficiently to keep the sulphates in solution, a strength of 1.10 to 1.20 specific gravity, is satisfactory. The titanic oxide of the reaction product is so readily soluble that when treated with acid of sufficient strength to dissolve the impurities, titanic sulphate is produced and passes into solution at temperatures below and at boiling. To prevent this loss and to obtain a greater proportion of the impurities in solution, I heat the materials in closed vessels capable of resisting pressure and so designed that the contents can be agitated to a temperature above the boiling point of the sulphuric acid used, a temperature of 300° F. I find ample. I may attain this temperature by the use of steam at 55 pounds gage pressure as a heating medium. Any titanium sulphate which may form is decomposed into modified metatitanic acid and basic titanic sulphate, setting free the sulphuric acid to combine with the impurities. By this means a purer concentrate is obtained than has been heretofore possible with a smaller consumption of acid and a smaller loss of titanium. The solution is then separated from the concentrate. It contains the impurities as sulphates. If it is desired to recover the magnesium sulphate content, the solution may be evaporated sufficiently to cause the separation of the magnesia and iron as sulphate crystals, or to dryness, mixing the mass with dolomite in sufficient quantities to form sulphates of calcium and magnesium with the sulphuric acid combined with the iron, aluminum and manganese and roasting it at a red heat, whereby there are formed sulphates of calcium and magnesium and oxides of iron and manganese. The soluble sulphates of magnesium and sodium are leached from the insoluble calcium sulphate and ferric oxide. The magnesium sulphate is readily separated by crystallization from the more readily soluble sodium sulphate. The solids when dry are the Venetian red of commerce, and magnesium sulphate the Epsom salts of commerce. By this means, I recover all the sulphuric acid used except the small amount combined with the soda, which, owing to the low value of sodium sulphate, I prefer to waste.

The reaction product is when dry a grayish white powder freer from impurities than are titanium concentrates heretofore made. The concentrate differs from concentrates heretofore produced in that the titanium is present as a hydrated titanic oxide containing basic titanic sulphate, instead of interchanged titanic oxides, as in concentrates heretofore produced. The hydrated titanic oxide and basic titanic sulphate contents range from 92% to 99%; the combined water contained from 11% to 18%, a typical analysis of a sample being $TiO_2xOH_2+(TiO)SO_4xOH_2$ 97.77; FeO .54; $Al_2O_3$ .14; $Na_2O$ 09; MgO .04; $SiO_2$ 1.28; carbon and undetermined .14. The $TiO_2$ content ranges from 80% to 90%. It is so extremely soluble in sulphuric acid that it passes into solution completely in acid containing but 50% $SO_3$ on continued boiling.

I bring it into solution by mixing it with a 50% dilute $H_2SO_4$ using preferably a slight excess above the theoretical quantity required to produce titanic sulphate and bring it to a boil at which temperature it is converted into a thick syrupy solution. To the solution I add sufficient water to make the solution filterable. I have found a solution having a specific gravity of 1.35 to 1.45 adapted to this.

The solution which contains the small amount of iron not removed as mixed ferric and ferrous sulphate, I reduce in order to convert all the iron to ferrous sulphate. I may do this by electrolysis or by adding a reducing agent, such as titanous sulphate. In either case, I add an excess of titanous sulphate in sufficient amount to prevent any reoxidation of ferrous to ferric sulphate previous to or during the separation of the titanic oxide from the solution. I filter the solution and add to it a small amount of hydrochloric acid, 3% by volume being generally sufficient. Both titanous sulphate and hydrochloric acid tend to prevent precipitation of iron as basic ferric sulphate and the hydrochloric acid tends to reduce the amount of basic titanic sulphate passing into the pecipitate. Hydrochloric acid tends to prevent complete precipitation of my modified meta titanic acid and titanous sulphate is not decomposed under the conditions existing. I therefore use the smallest amount of each which will give the desired result.

I have found that titanic sulphate solutions have critical temperatures at which they decompose, hydrated titanic oxide and basic titanic sulphate precipitating and sulphuric acid remaining in the solution. For example, a solution of titanic sulphate in water containing .5% $TiO_2$ partially decomposed at atmospheric temperature, one containing 1.50% $TiO_2$ began to decompose at 120° F. and was completely decomposed by boiling, one containing 2.50% $TiO_2$ did not begin to decompose until it reached a boiling temperature and was not completely decomposed after four hours boiling. A solution containing 10% $TiO_2$ and 5% free acid did not decompose at 220° F., at 275° F. it had begun to decompose, at 325° F. decomposition was 99% complete. After heating it to 380° F., 7% of the contained $TiO_2$ remained in solution after cooling through its critical temperature.

I have also found that when solutions are decomposed under pressure at temperatures above ordinary boiling the precipitate contains more hydrated titanic oxide and less basic titanic sulphate than when produced by diluting the solution and decomposing at a boiling temperature or below. In carrying out my process, I place the reduced solution in a suitable vessel capable of resisting pressure, and heat it to its critical temperature or slightly above it and keep it at that temperature till decomposition is complete. I find two hours generally ample. The solution remaining consists of sulphuric acid having a specific gravity of about .05 less than the specific gravity of the titanium solution used, when it is between 1.35 and 1.45 specific gravity. It will contain as impurities practically all of the iron and other impurities contained in the titanic solution and from none to 2% of the $TiO_2$. Owing to its relatively high concentration and greater freedom from impurities, it is of greater value than is sulphuric acid recovered from any process heretofore disclosed. It may be utilized for many purposes without further concentration, as in the manufacture of fertilizers, or may be concentrated for shipment. The recovery is from 86 to 90% of the acid used after deducting the amount necessary for purifying the concentrate.

The precipitate is my modified metatitanic acid containing basic titanic sulphate. It is freer from other impurities, more especially iron, than are precipitates of metatitanic acid made from materials containing iron. It will contain from one-fourth to one-half as much basic titanic sulphate as does metatitanic acid by boiling at atmospheric pressure, and one-third as much or less of combined water. Its specific gravity ranges from 3.00 to 3.30, while that of metatitanic acid from sulphuric acid solutions ranges from 2.70 to 2.80. Analyses of it and of metatitanic acid dried at 25° C. are as follows:

|  | $TiO_2$ | $Fe_2O_3$ | $SO_3$ | $H_2O$ |
|---|---|---|---|---|
| Modified metatitanic acid | 92.90 | .008 | 1.94 | 5.09 |
| Modified metatitanic acid | 92.85 | .005 | 2.15 | 4.95 |
| Metatitanic acid | 75.48 | .001 | 7.93 | 16.56 |
| Metatitanic acid | 76.60 | .001 | 6.07 | 17.26 |

The modified meta titanic acid was made from ilmenite by my process. The meta titanic acid from C. P. titanic acid by solution and reprecipitation. It may be converted into titanic oxide $TiO_2$ in the usual way by igniting it to the temperature at which basic titanic sulphate decomposes into $SO_3$ and $TiO_2$. I have found that meta titanic and modified meta titanic acid are not entirely freed from the $SO_3$ contained in the accompanying basic titanic sulphate at 1500° F., after long heating, and that they begin to shrink and change from soft amorphous powders to powders which contain hard gritty particles which greatly reduce their hiding and covering quality when used for pigments for paints, when heated at 1100° F. and upwards. I have further found that when titanic acid or modified meta titanic acid containing appreciable quantities of $SO_3$ are manufactured into paints, the $SO_3$ tends to discolor the paint after exposure to the weather and to cause it to chalk.

To overcome these defects and obtain more valuable pigments, I remove the $SO_3$ content of the basic titanic sulphate from meta titanic acid and from modified meta titanic acid by bringing them into a paste with water, adding to the paste any of the many substances which have a greater affinity for $SO_3$ than has $TiO_2$ in sufficient quantity to combine with all of the $SO_3$ in the paste. Many of these substances are enumerated in my pending application, Serial No. 285,873, filed March 28, 1919. I have found soda ash and barium hydrate convenient substances for the purpose. The mixture after being placed in a suitable vessel arranged to agitate the contents and capable of resisting pressure, is heated and agitated till the reaction is complete. When soda ash is used, there is produced modified meta titanic acid and soluble sodium sulphate; when barium hydrate is used insoluble barium sulphate replaces the sodium sulphate. A sample of the solids is now washed to free it from impurities and rapidly dried. If it is sufficiently white no further treatment is necessary. If, as is often the case, it has a creamy or yellowish tinge, I place the washed product in a vessel similar to the one used to remove the $SO_3$ and treat it with $SO_2$ either as a gas or in solution, at slightly above atmospheric pressure. The product after freeing it from the $SO_2$ solution and drying, is my pure modified meta titanic acid having a specific gravity of 3.20 to 3.30. The bleaching may be conducted in open vessels with equally good results, but at the expense of a greater consumption of $SO_2$.

It is a soft amorphous white or creamy white powder which has great value when used as a pigment for paints. I have found it to contain when analyzed:

| $TiO_2$ | $H_2O$ | $Fe_2O_3$ | $SO_3$ | $SiO_2$ | Total |
|---|---|---|---|---|---|
| 93.96 | 6.24 | .01 | .03 | Trace. | 99.94 |
| 94.90 | 5.00 | Trace. | .06 | Trace. | 99.96 |
| 94.68 | 5.28 | .006 | Trace. | .01 | 99.98 |

If titanic oxide is desired, the unbleached or bleached product is heated to a temperature sufficient to free it from $H_2O$ but not sufficient to "shrink" it. I find 800° F. ample to remove the combined water and that at temperatures below 1100° F., the physical character of titanic oxide is not deleteriously affected. The specific gravity of the calcined titanic oxide produced by calcining modified meta titanic acid freed from $SO_3$ at temperatures below 1100°F. is 3.30 to 3.45. My modified meta titanic acid differs from the product which may be obtained by heating meta titanic acid above 100° C. to drive off a portion of its combined water, in that it does not reabsorb water from the atmosphere or when dampened return to the state of hydration it originally had.

I claim:

1. Those steps in the process of treating titaniferous material, which consist in heating the material in the presence of carbonaceous material and an operative sodium compound to reduce the iron content to a metallic state, treating the reaction product with an acid at a temperature above its boiling point and under pressure to render the solvent action of the acid on the titanium content small, and separating the residue from the solution.

2. Those steps in the process of treating titaniferous material, which consist in heating said material in the presence of carbon and an alkali, nodulizing the resultant mass, again heating the mass to reduce the iron to metallic state, removing the iron, subjecting the remaining molten slag to a rapid lowering of temperature to granulate the same, and treating said slag to recover the titanium.

3. That step in the process of treating a titaniferous material, which consists in heating under pressure a titanic oxide and impurities in the presence of a dilute acid to a temperature above the boiling point of the acid and which lessens the action of the acid on the oxide and dissolves the impurities.

4. That step in the process of treating a solid titanic hydrate, which consists in heating the material with acid at a temperature higher than its boiling point.

5. That step in the process of treating titaniferous material, which consists in heating the material containing impurities with dilute acid to about 300° F.

6. That step in the process of treating titaniferous material, which consists in heating the material containing sulphates and titanic oxide with a dilute acid to a temperature above which no titanic sulphates are held in solution and any titanic sulphate previously formed is precipitated.

7. That step in the process of treating titaniferous material, which consists in heating under pressure titanic oxide and sodium compounds in the presence of an acid to a temperature above the boiling point of the acid.

8. That step in the process of treating titaniferous material, which consists in heating under pressure a mixture containing titanic oxide and impurities in the presence of an acid to a temperature above the boiling point of the acid while agitating the mixture.

9. That step in a process of treating titaniferous material, which consists in heating a solution containing titanic sulphate, hydrochloric acid and ferric and ferrous sulphate under pressure to its critical temperature until decomposition is complete.

10. Those steps in the process of treating a titaniferous material, which consist in heating said material with carbonaceous material and an alkali to reduce the iron oxide usually present in such material, nodulizing the mixture while heating the same, further heating said mixture to reduce the iron to metallic state and form a titaniferous slag, and treating said slag to recover the alkali and titanium separately.

11. That step in the process of treating a titaniferous material, which consists in disintegrating sodium titanate by subjecting it to a caustic soda solution.

12. That step in the process of treating titaniferous material, which consists in heating under pressure a finely divided reaction product containing sodium titanate in the presence of an acid to a temperature above the boiling point of the acid.

13. That step in the process of treating titaniferous material, which consists in heating a sodium titanate in water under pressure.

14. Those steps in the process of treating a titaniferous material, which consist in heating a sodium titanate in water under pressure, and separating the solid material from the mixture.

15. As a new article, a hydrated titanium concentrate containing 80 per cent or over of titanium oxide, basic titanic sulphate, and water in excess of 11 per cent.

16. As a new article, a hydrated titanium concentrate containing 80 per cent or over of titanium oxide and basic titanium sulphate and water.

17. A calcined titanium oxide in the form of a fine amorphous non-granular powder having a specific gravity of 3.30 to 3.45.

18. A stable calcined titanium oxide in the form of a fine smooth non-granular powder having a specific gravity not exceeding 3.45.

19. Those steps in the process of treating an impure titaniferous material containing iron oxide, which consist in heating a mix containing such material, together with a carbonaceous material and an alkali, to effect a reaction between the alkali and substances in the material and to effect a reduction of the iron oxide at a temperature insufficient to fuse the alkali-metal compounds.

20. Those steps in the process of treating an impure titaniferous material containing iron oxide, which consist in heating a mix containing such material, together with a carbonaceous material and a sodium compound, to effect a reaction between the sodium compound and the substances in the material to form sodium compounds and to effect a reduction in the iron oxide at a temperature insufficient to fuse the sodium compounds.

21. Those steps in the process of treating an impure titaniferous material containing iron oxide, which consist in heating a mix containing such material, together with a carbonaceous material and soda ash, to effect a reaction between the soda ash and substances in the material to form sodium compounds and to effect a reduction of the iron oxide at a temperature insufficient to fuse the sodium compounds.

22. That step in the process of treating an impure titaniferous material containing iron oxide, alkali-metal compounds of titanium and a reducing agent, which consists in heating the material to effect a reduction of the iron oxide at a temperature insufficient to fuse the alkali-metal compounds.

23. Those steps in the process of treating an impure titaniferous material containing iron oxide, alkali-metal compounds of titanium and a reducing agent, which consists in heating the material to effect a reduction of the iron oxide at a temperature insufficient to fuse the alkali-metal compounds, further heating the material to cause separation of the iron from the alkali-metal compounds, separating the iron and treating the residue to recover the titanium content.

24. Those steps in the process of treating an impure titaniferous material containing iron oxide, alkali-metal compounds of titanium and a reducing agent, which consist in heating the material to effect a reduction of the iron oxide at a temperature insufficient to fuse the alkali-metal compounds, further heating the material to cause separation of the iron from the alkali-metal compounds, separating the iron, treating the residue to recover an alkali-metal compound, and further treating it to recover the titanium content.

25. Those steps in the process of treating an impure titaniferous material containing iron oxide, which consist in heating a mix containing such material, together with a carbonaceous material and an alkali, to effect a reaction between the alkali and substances in the material to form alkali-metal compounds and to effect a reduction of the iron oxide at a temperature insufficient to fuse the alkali-metal compounds, separating the iron and treating the residue to recover the titanium content.

26. Those steps in the process of treating an impure titaniferous material containing iron oxide, which consist in heating a mix containing such material, together with a carbonaceous material and an alkali, to effect a reaction between the alkali and substances in the material to form alkali-metal compounds and to effect a reduction of the iron oxide at a temperature insufficient to fuse the alkali-metal compounds, separating the iron, treating the residue to recover an alkali and further treating it to recover the titanium content.

27. Those steps in the process of treating a titaniferous material, which consist in heating the material in the presence of carbonaceous material and an alkali to reduce the iron content to metallic state, removing the iron, granulating the remaining slag, then pulverizing the granulated slag and treating said pulverized slag to recover the titanium.

28. Those steps in the process of treating a titaniferous material, which consist in heating said material in the presence of carbonaceous material and an alkali to reduce the iron content to a metallic state, removing the iron, subjecting the remaining molten slag to a rapid lowering of temperature, then pulverizing the slag and treating the pulverized slag to recover the titanium.

29. Those steps in the process of treating titaniferous material, which consist in heating the material to reduce the iron content to a metallic state, granulating the resulting slag, pulverizing the same and treating the pulverized slag to reciver the titanium.

30. Those steps in the process of treating a titaniferous material, which consist in treating the material to produce a slag, granulating the slag, then pulverizing the granulated slag and treating the same to recover the titanium.

In testimony whereof I have hereunto set my hand.

FRANK E. BACHMAN.